United States Patent [19]

Yamazaki et al.

[11] Patent Number: 6,018,010
[45] Date of Patent: *Jan. 25, 2000

[54] POLYMER WITH HIGH ACID VALUE FROM UNSATURATED CARBOXYLIC ACID AND VINYL MONOMER

[75] Inventors: Hiroshi Yamazaki, Osaka; Kenji Minami, Shiga; Youhei Murakami, Osaka, all of Japan

[73] Assignee: Nippon Shokubai Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/635,302

[22] Filed: Apr. 19, 1996

[30] Foreign Application Priority Data

Apr. 26, 1995 [JP] Japan ......................... 7-102059
May 30, 1995 [JP] Japan ......................... 7-132201

[51] Int. Cl.$^7$ ................................. C08F 220/10
[52] U.S. Cl. ......................... 526/318.4; 526/318.2
[58] Field of Search ............... 526/318.2, 318.4, 526/262, 271, 291, 273

[56] References Cited

U.S. PATENT DOCUMENTS

| | | |
|---|---|---|
| 4,569,960 | 2/1986 | Blake . |
| 4,645,783 | 2/1987 | Kinoshita . |
| 4,786,696 | 11/1988 | Bohnel . |
| 5,317,063 | 5/1994 | Komatsu . |
| 5,496,904 | 3/1996 | Moriya ......................... 526/318.4 |
| 5,536,787 | 7/1996 | Scholz . |

FOREIGN PATENT DOCUMENTS

| | | | |
|---|---|---|---|
| 50-63085 | 5/1975 | Japan | ........... C08F 2/00 |
| 59-215365 | 12/1984 | Japan | ........... C09D 5/20 |
| 60-155212 | 8/1985 | Japan | ........... C08F 220/10 |
| 1165685 | 6/1989 | Japan | ........... C09J 7/02 |
| 596689 | 4/1993 | Japan | ........... B32B 27/10 |
| 5179092 | 7/1993 | Japan | ........... C08L 33/08 |
| 651860 | 7/1994 | Japan | ........... C09D 151/00 |

OTHER PUBLICATIONS

Chemical Abstracts, vol. 108, No. 24, Jun. 13, 1988; Columbus, Ohio, US; Abstract No. 205294.

*Primary Examiner*—Christopher Henderson
*Attorney, Agent, or Firm*—Pendorf & Cutliff

[57] ABSTRACT

A polymer, a process for producing the same, and the use thereof. The polymer comprises structural units derived from an α,β-unsaturated carboxylic acid monomer and structural units derived from another vinyl monomer, the polymer having (1) an acid value of 50 mgKOH/g or higher, (2) when analyzed with a differential scanning calorimeter, a differential curve having at least one peak top in each of the range of from −80 to 20° C. and the range of from 20 to 120° C., and (3) a parallel-ray transmittance of 80% or higher.

3 Claims, 1 Drawing Sheet

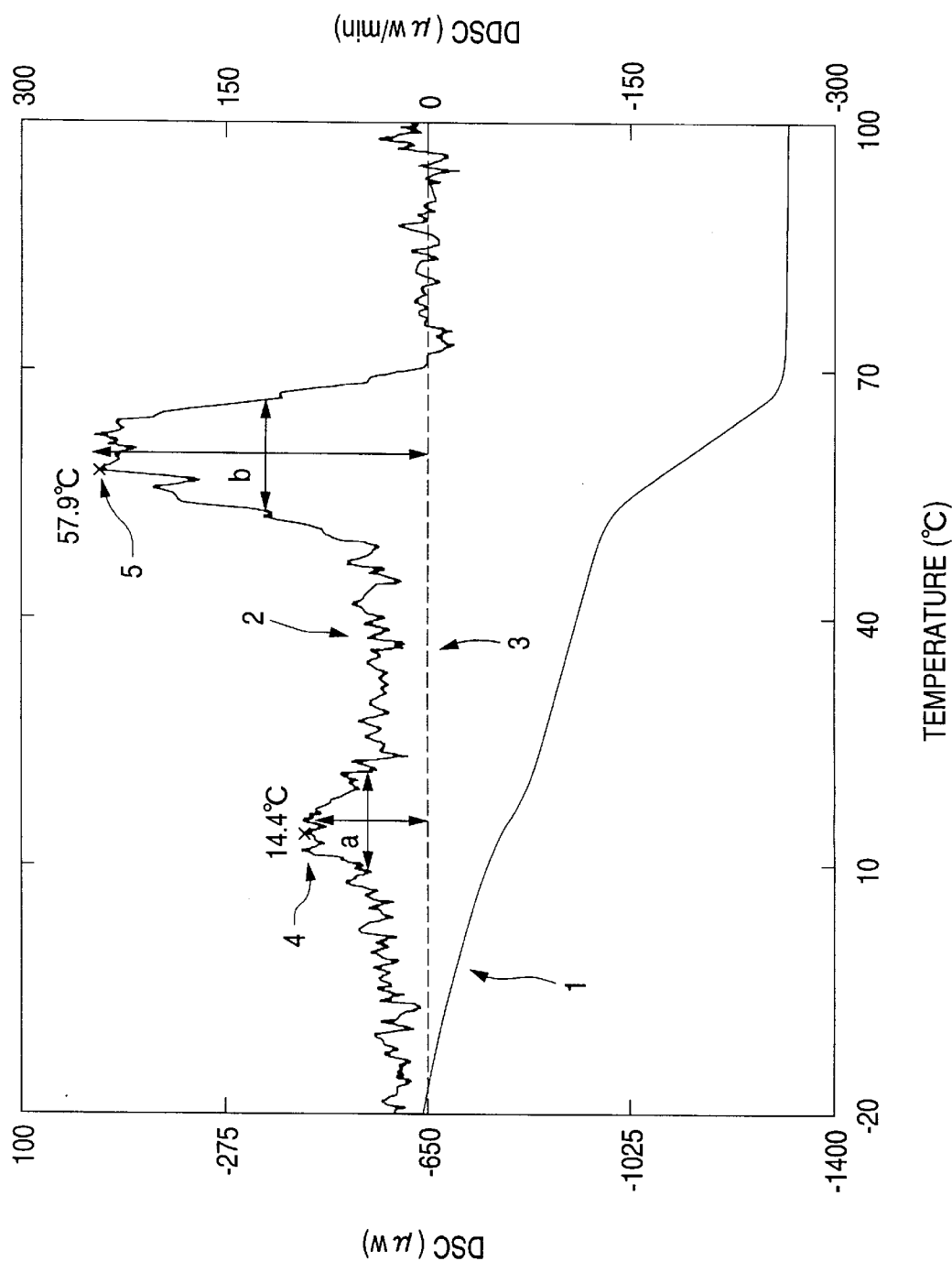
FIGURE

POLYMER WITH HIGH ACID VALUE FROM UNSATURATED CARBOXYLIC ACID AND VINYL MONOMER

FIELD OF THE INVENTION

The present invention relates to a polymer characterized as having excellent transparency, a specific acid value, and a specific glass transition point distribution, and also to uses therefor and a process for producing the same. The polymer of the present invention is useful in the filed of various molded materials, in particular film, sheet, and the like. The film of the present invention is useful especially in applications such as a packaging bag, a label, and various coated papers, and is usable also in laminated films comprising the film and various other resins. Furthermore, the polymer of the present invention is usable also in a coating material, and the coating material containing the polymer is useful in application to various papers and films.

BACKGROUND OF THE INVENTION

In general, most vinyl polymers undergo glass transition in a narrow temperature range of about 20° C. and, when analyzed with a differential scanning calorimeter (hereinafter abbreviated as DSC), give a differential curve having only one peak, which corresponds to the glass transition temperature (hereinafter abbreviated as Tg) thereof. In particular, in the case of acrylic and similar films, since the polymer compositions constituting the films have a Tg of from 20 to 40° C., these films have the following problems; (1) the strength thereof varies considerably with changing temperature, (2) they are susceptible to blocking at high temperatures, (3) they have poor flexibility at low temperatures, and (4) they are insufficient in tensile strength and tear strength.

Furthermore, there is recently a growing desire for a water-soluble and/or alkali-soluble vinyl polymer, because vinyl polymers having such solubility characteristics can be used in various applications.

When a film obtained from a vinyl polymer is used as a label base, there are cases where the film is required to have the property of swelling in an aqueous alkali solution.

Examples of vinyl polymers having one Tg include the (meth)acrylate/(meth)acrylic acid copolymer film disclosed in JP-A-60-155212 and JP-A-1-165685 which is soluble in aqueous alkali solutions. (The term "(meth)acrylic" and the like used herein means "acrylic or methacrylic" and the like.) (The term "JP-A" as used herein means an "unexamined published Japanese patent application.") Further, in JP-A-5-96689 is disclosed a laminated paper obtained by laminating a paper with a layer of a plastic which consists mainly of an acrylic ester polymer comprising units derived from either an α,β-unsaturated carboxylic acid or a vinyl-containing acid anhydride and is soluble in alkaline solutions. However, these film and laminated paper each has the problems (1) to (4) described above because the polymer constituting or contained in the film or laminated paper has only one Tg. A possible method for overcoming these problems is to design a polymer so as to have not one but two or more Tg values.

An acrylic resin composition having two or more Tg values is disclosed in JP-A-59-215365. The resin composition consists mainly of a mixture of an acrylic resin emulsion having a Tg of from 20 to 50° C. and an acrylic resin emulsion having a Tg of from −10 to 15° C. Although superior in releasability and adhesion due to these Tg values, the resin composition is not homogeneous on a molecular level because it is not a single polymer but a mixture of polymers. Consequently, films obtained from the resin composition have poor transparency, are susceptible to whitening upon stretching, and have low tear strength. In addition, the acrylic resin is neither water-soluble nor alkali-soluble.

A resin which is not a blend but a single polymer and is considered to have two or more Tg values is given in JP-A-5-179092 and JP-B-6-51860. (The term "JP-B" as used herein means an "examined Japanese patent publication.") These techniques relate to emulsion polymerization. Since the monomers usable in emulsion polymerization are generally limited to only a small part of various polymerizable monomers, polymer designs are considerably restricted and attainable film properties are also limited.

In the techniques described in JP-A-5-179092 and JP-B-6-51860, an emulsified polymer having the so-called "core-shell" structure is synthesized by a multistage emulsion polymerization process. However, when such an emulsified polymer having the "core-shell" structure is used to form a film, the cores mostly remain dispersed although the shells are usually fused to one another. As a result, the film has a heterogeneous structure comprising the cores dispersed in a continuous phase formed from the shells. Due to its heterogeneous structure, the film formed from an emulsified polymer having the "core-shell" structure generally has problems of, e.g., poor mechanical strength and susceptibility to whitening upon water absorption. The emulsified polymer shown in JP-A-5-179092 and JP-B-6-51860 is a polymer designed mainly for a coating composition to form a coating film, and is superior in properties such as mechanical strength and water resistance to conventional emulsified polymers for coating compositions. However, for use as a film where transparency is especially required such as packaging bags and labels, the emulsified polymer proposed in those references is insufficient in transparency and mechanical strength and also in resistance to whitening upon water absorption. The emulsified polymer shown in JP-A-5-179092 and JP-B-6-51860 is neither water-soluble nor alkali-soluble.

Another method for imparting both flexibility and tensile strength is to use a polymer which undergoes glass transition over a wide temperature range. A method for obtaining such a polymer is described in JP-A-50-63085; this method is generally called a power feed method. Upon analysis with a DSC, the polymer obtained by this method gives a differential curve having one broad peak. However, the vinyl polymer for films obtained by this method necessarily contains a large proportion of a polymer component having a Tg in the range of from 20 to 40° C. from the standpoint of a balance among tensile strength, flexibility, etc. The polymer therefore has a problem that the mechanical strength and other properties thereof vary considerably in the temperature range where the polymer is used.

If the emulsion polymerization process described in JP-B-6-51860 is used for synthesizing a polymer having a high acid value so as to be water-soluble and/or alkali-soluble, the α,β-unsaturated carboxylic acid monomer used as an essential ingredient partly dissolves into the water to undergo aqueous-solution polymerization. The aqueous-solution polymerization yields a by-product polymer in which the content of units derived from the α,β-unsaturated carboxylic acid is higher than the predetermined value. As a result, the water resistance of the polymer thus yielded becomes lower than the predetermined level. In addition, the polymer containing such a large proportion of units derived from the α,β-unsaturated carboxylic acid considerably differs in solubility parameter from the polymer simultaneously produced by emulsion polymerization and is hence incompatible with the polymer produced by emulsion polymerization. As a result, the final polymer product thus obtained is not homogeneous as a whole, is opaque, and has insufficient mechanical strength.

On the other hand, use of the (meth)acrylate-(meth) acrylic acid copolymer film soluble in aqueous alkali solutions as a label which is disclosed in JP-A-60-155212 and JP-A-1-165685 is advantageous in that the label dissolves away during the step of alkali washing of bottles or the like. However, before the alkali washing solution is discarded, the polymer dissolved therein should be precipitated by, e.g., neutralization and filtered off.

SUMMARY OF THE INVENTION

An object of the present invention is to provide a polymer which undergoes little change in properties with changing temperature; is water-soluble, alkali-soluble, water-swelling, and/or alkali-swelling; and has excellent transparency.

Another object of the present invention is to provide a film, label, and packaging bag which are printable, undergo little change in strength with changing temperature, are less susceptible to blocking at high temperatures, are highly flexible at low temperatures, have high tensile and tear strength, are less susceptible to whitening upon stretching, are water-soluble and/or alkali-soluble, and have excellent transparency.

Still another object of the present invention is to provide a label which is printable, undergoes little change in strength with changing temperature, is less susceptible to blocking at high temperatures, is highly flexible at low temperatures, has high tensile and tear strength, is less susceptible to whitening upon stretching, has excellent transparency, and peels off in an aqueous alkali solution.

A further object of the present invention is to provide a coating material capable of forming a coating layer which is printable, is less susceptible to blocking at high temperatures, is highly flexible at low temperatures, is water-soluble and/or alkali-soluble, and is excellent in transparency and gloss.

Still a further object of the present invention is to provide a process for easily and efficiently producing a polymer which is printable, undergoes little change in strength with changing temperature, is less susceptible to blocking at high temperatures, is highly flexible at low temperatures, has high tensile and tear strength, is less susceptible to whitening upon stretching, is water-soluble or alkali-soluble, and has excellent transparency.

The present invention relates to a polymer comprising structural units derived from an $\alpha,\beta$-unsaturated carboxylic acid monomer and structural units derived from another vinyl monomer, the polymer having
  (1) an acid value of 50 mgKOH/g or higher,
  (2) when analyzed with a differential scanning calorimeter, a differential curve having at least one peak top in each of the range of from −80 to 20° C. and the range of from 20 to 120° C., and
  (3) a parallel-ray transmittance of 80% or higher.

In the polymer of the present invention, the $\alpha,\beta$-unsaturated carboxylic acid monomer is preferably at least one selected from the group consisting of acrylic acid and methacrylic acid, and the structural units derived from the $\alpha,\beta$-unsaturated carboxylic acid monomer are contained in an amount of at least 7% by weight based on the amount of the polymer.

It is also preferred that at least 30% by weight of the structural units derived from the another vinyl monomer is at least one selected from the group consisting of an alkyl acrylate and an alkyl methacrylate.

The present invention also relates to a film comprising the polymer of the present invention.

The present invention also relates to a label comprising the film of the present invention having thereon an adhesive.

The present invention also relates to a packaging bag comprising the film of the present invention.

The present invention also relates to a coating material comprising the polymer of the present invention and an organic solvent.

The present invention relates to a process for producing a polymer by non-aqueous polymerization which comprises the steps of:

polymerizing a first monomer mixture comprising at least 7% by weight, based on the total amount of the first monomer mixture, of an $\alpha,\beta$-unsaturated carboxylic the monomer and another vinyl monomer by non-aqueous polymerization to a conversion of from 20 to 80%, and
  adding dropwise or portion-wise a second monomer mixture comprising at least 7% by weight, based on the total amount of the second monomer mixture, of an $\alpha,\beta$-unsaturated carboxylic acid monomer and another vinyl monomer to a non-aqueous polymerization system of the first monomer mixture, so as to further conduct polymerization, the second monomer mixture giving a polymer having a glass transition temperature different from a glass transition temperature of a polymer obtained from the first monomer mixture. The second monomer mixture to be added to the polymerization system of the first monomer mixture may be a non-polymerized monomer mixture or a partly polymerized polymerization system having a conversion, for example, of from 20 to 80%.

In the above process for producing a polymer according to the present invention, it is preferred that the difference in content of the $\alpha,\beta$-unsaturated carboxylic acid monomer between the first monomer mixture and the second monomer mixture is 10% by weight or smaller.

BRIEF DESCRIPTION OF THE DRAWING

FIGURE shows a DSC curve and a differential curve both obtained by analyzing the high-acid-value polymer obtained in Example 1 with a differential scanning calorimeter.

DETAILED DESCRIPTION OF THE INVENTION

The polymer of the present invention having a high acid value and a process for producing the same are described below.

The polymer of the present invention is obtained by polymerizing an $\alpha,\beta$-unsaturated carboxylic acid monomer and another vinyl monomer and has an acid value of 50 mgKOH/g or higher.

Examples of the $\alpha,\beta$-unsaturated carboxylic acid monomer include $\alpha,\beta$-unsaturated carboxylic acids such as acrylic acid, methacrylic acid, maleic acid, itaconic acid, and fumaric acid; $\alpha,\beta$-unsaturated carboxylic anhydrides such as maleic anhydride and itaconic anhydride; and $\alpha,\beta$-unsaturated dicarboxylic monoesters such as maleic monoesters, fumaric monoesters, and itaconic monoesters. Two or more of these $\alpha,\beta$-unsaturated carboxylic acid monomers may be used in combination.

Use of acrylic acid and/or methacrylic acid as the $\alpha,\beta$-unsaturated carboxylic acid monomer is preferred in that this improves flexibility and toughness.

Examples of the another vinyl monomer include acrylic or methacrylic esters of monohydric alcohols having 1 to 18 carbon atoms, such as methyl acrylate, ethyl acrylate, propyl acrylate, butyl acrylate, stearyl acrylate, methyl methacrylate, ethyl methacrylate, propyl methacrylate, butyl methacrylate, and stearyl methacrylate; vinyl monomers containing a nitrile group, such as acrylonitrile and methacrylonitrile; vinyl monomers containing an amide group, such as acrylamide and methacrylamide; vinyl monomers containing a hydroxyl group, such as hydroxyethyl acrylate and hydroxypropyl methacrylate; vinyl monomers containing an epoxy group, such as glycidyl methacrylate; metal salts of $\alpha,\beta$-unsaturated carboxylic acids, such as zinc acrylate and zinc methacrylate; aromatic vinyl monomers such as styrene and $\alpha$-methylstyrene; aliphatic vinyl monomers such as vinyl acetate; vinyl monomers containing a halogen, such as vinyl chloride, vinyl bromide, vinyl iodide, and vinylidene chloride; allyl ethers; maleic acid derivatives such as dialkyl maleates; fumaric acid derivatives such as dialkyl fumarates; maleimide and derivatives thereof such as N-methylmaleimide, stearylmaleimide, N-phenylmaleimide, and N-cyclohexylmaleimide; itaconic acid derivatives such as dialkyl itaconates, itaconamides, itaconimides, and itaconamide esters; alkenes such as ethylene and propylene; and dienes such as butadiene and isoprene. Two or more of these vinyl monomers may be used in combination.

Use of an alkyl acrylate and/or an alkyl methacrylate as the another vinyl monomer is preferred in that a film superior in flexibility, toughness, gloss, weatherability, and transparency can be obtained. It is preferred to use the alkyl acrylate and/or alkyl methacrylate in an amount of 30% by weight or larger based on the total amount of all the other monomer used, because this enhances flexibility, toughness, gloss, weather resistance, and transparency. The alkyl acrylate and alkyl methacrylate are preferably an ester of acrylic or methacrylic acid with a monohydric alcohol having 1 to 18 carbon atoms, because use of such esters further improves flexibility, toughness, gloss, and weather resistance.

The proportion of the $\alpha,\beta$-unsaturated carboxylic acid monomer is preferably at least 7% by weight, more preferably at least 9% by weight, based on the total amount of the $\alpha,\beta$-unsaturated carboxylic acid monomer and the other vinyl monomer, because such a proportion thereof results in a sufficiently soluble polymer in which the content of structural units derived from the $\alpha,\beta$-unsaturated carboxylic acid monomer is at least 7% by weight based on the amount of the polymer. The proportion of the $\alpha,\beta$-unsaturated carboxylic acid monomer is further preferably from 7 to 40% by weight based on the total amount of all the monomers, because proportions thereof within this range result in a polymer having an excellent balance among solubility, water resistance, and flexibility.

Since the polymer of the present invention has a high acid value, it is soluble in water and/or alkali solutions, and/or swells in water and/or alkali solutions. The acid value thereof is 50 mgKOH/g or higher, and preferably 70 mgKOH/g or higher. The acid value of a polymer is herein determined by dissolving 1 g of the polymer in 100 g of methanol and titrating the solution with 0.1 N aqueous sodium hydroxide solution using an automatic titrator (COMTE-980, manufactured by Hiranuma Sangyo K.K., Japan). For applications where water resistance is required, the acid value of the polymer is preferably from 50 to 250 mgKOH/g, and more preferably from 70 to 250 mgKOH/g.

The number-average molecular weight of the polymer of the present invention is preferably 10,000 or higher. In the case where the polymer is especially for use in applications such as films, the number-average molecular weight thereof is preferably from 10,000 to 500,000 from the standpoint of moldability.

The most important property of the polymer of the present invention is the distribution of glass transition temperatures Tg. The Tg distribution of a polymer is judged from a differential curve obtained by analysis with a DSC. The analysis with a DSC is therefore highly important and it is crucial to carry out this analysis under the constant conditions. The method of this analysis is as follows.

A 10-mg sample is analyzed with DSC 220C, manufactured by Seiko Denshi Kogyo K.K., Japan, in a nitrogen atmosphere under the following conditions. The sample is firstly heated to 150° C. and then maintained at this temperature for 5 minutes. The sample is thereafter quenched to −100° C. and maintained at this temperature for 5 minutes. Subsequently, the sample is heated to 150° C. at a rate of 10° C./min to obtain a DSC curve and a DSC differential curve. A line is drawn through the points where the differential value is 0 $\mu$/min to form a base line for the differential curve.

In general, differential curves obtained by analysis with a DSC have many noises and minute peaks. In the present invention, the term "peak top" means that point on a distinct major peak which shows the highest differential value in the peak. For example, a peak having a peak top height of 50 $\mu$W/min or higher and a half value width of 5 to 30° C. is preferred as the major peak. The reason why peaks having a half value width of 5° C. or larger are preferred is that most of the peaks attributable to additives and the like have a small half value width and these peaks should be distinguished from the peaks attributable to the polymer itself, i.e., assignable to the Tg values of the polymer, which are important in the present invention. The reason why peaks having a half value width of 30° C. or smaller are preferred is as follows. The present invention can be characterized by a polymer having reduced temperature sensitivity and combining various properties by utilizing the coexistence of polymer components each having a Tg in a specific range. Therefore, the presence of an unnecessarily broad peak, that is, a polymer component having an unnecessarily broad Tg distribution, is not preferred in the present invention.

In the differential curve described above, the heights of peaks from the base line indicate the quantities of heat absorption per unit time at the respective temperatures corresponding to these peaks. Namely, it is considered that the height of the peak appearing at a given temperature indicates the amount of the polymer component whose Tg is that temperature. Consequently, by comparing peaks with each other in height, the relative amounts of the polymer components whose Tg values are the respective temperatures can be determined. Further, by comparing the area of each of the individual peaks with the area of the whole differential curve, the proportion of each of the polymer components whose Tg values are the respective temperature ranges in the whole polymer can be determined.

The polymer of the present invention, when analyzed with a DSC, gives a differential curve having at least one peak top in the range of from −80 to 20° C., preferably from −30 to 20° C., (lower-temperature-side peak top) and at least one peak top in the range of from 20 to 120° C., preferably from 40 to 100° C., (higher-temperature-side peak top). The presence of the lower-temperature-side peak top especially in the range of from −30 to 20° C. is advantageous in that films or the like comprising the polymer are highly flexible at low temperatures, have high tear strength, and are less susceptible to blocking. The presence of the higher-temperature-side peak top in the range of from 40 to 80° C. is preferred in that films or the like comprising the polymer have high tensile strength and satisfactory nerve, are tough, and do not undergo blocking. In order for the polymer to have various excellent properties, the lower-temperature-side peak top is preferably apart from the higher-temperature-side peak top by at least 30° C.

In the differential curve described above, the proportion of the height of the lower-temperature-side peak top from the base line to the height of the higher-temperature-side peak top from the base line:

$$\frac{\text{height of the lower-temperature-side peak top}}{\text{height of the higher-temperature-side peak top}}$$

has preferred ranges depending on uses for the polymer. For example, in the case of using the polymer of the present invention especially in applications such as films, that proportion is preferably in the range of from 1/9 to 6/4 from the standpoint of a balance among mechanical strength, anti-block properties, etc. More specifically, for applications where tear strength and high elongation or low-temperature flexibility are important, that proportion is preferably from 2/8 to 6/4, while for applications where tensile strength or anti-block properties are important, that proportion is preferably from 1/9 to 4/6.

The differential curve obtained by analysis with a DSC may have a peak top in the range of from 20 to 40° C. However, if such a peak top in the range of from 20 to 40° C. is too large, films or the like obtained from the polymer have large temperature sensitivity to undergo considerable changes in mechanical strength and other properties in the temperature range for ordinary use. It is therefore preferred that the proportion of the area of the peak appearing in the range of from 20 to 40° C. is 50% or smaller based on the total area of all peaks.

However, in the case where the component to which the lower-temperature-side peak top is attributable is poorly compatible with the component to which the higher-temperature-side peak top is attributable, the presence of a third component which is intermediate in composition between these two components and gives a peak in the range of from 20 to 40° C. is preferred because the third component functions as a compatibility-improving agent for those two components to impart sufficient transparency. In this case, the proportion of the area of the peak appearing in the range of from 20 to 40° C. in the differential curve to the total area of all peaks is desirably 5% or higher, preferably 10% or higher.

By designing a polymer so as to have a specific distribution of Tg values as described above, the polymer obtained can be useful as a film or another product which are excellent in mechanical strength, anti-block property, and transparency. Although the polymer of the present invention has an acid value of 50 mgKOH/g or higher, the technique of the present invention for designing a polymer so as to have a specific distribution of Tg values is also applicable to polymers having an acid value lower than 50 mgKOH/g. It should, however, be noted that in the case where a film obtained from a polymer having an acid value lower than 50 mgKOH/g is used as a label without using any other material and applied by means of heat sealing or the like, there may be a problem that the applied label does not peel off the substrate even with treatment with an aqueous alkali solution.

The polymer of the present invention is characterized as having high transparency due to the homogeneous structure thereof. Transparency is evaluated based on the parallel-ray transmittance to a visible light having a wavelength of from 400 to 700 nm, measured with a hazemeter equipped with a halogen lamp as a light source and a polarizing filter (ND-1001DP, manufactured by Nippon Denshoku Kogyo K.K., Japan). For measuring the parallel-ray transmittance of a rigid polymer for film or similar use, a 65 $\mu$m-thick test piece molded therefrom by, e.g., any of various extrusion molding techniques and conditioned in a 23° C. 65% RH atmosphere for 24 hours is used, and visible rays are caused to strike thereon in the direction of the thickness thereof. Test pieces to be subjected to the measurement do not undergo any special surface-modifying processing, e.g., embossing.

In the case of a soft polymer for use as, e.g., a pressure-sensitive adhesive, a polymer layer having a thickness of 65 $\mu$m is formed on a 10 $\mu$m-thick PET film by casting, and the cast layer is covered with a 10 $\mu$m-thick PET film to prepare a test piece comprising the polymer sandwiched between PET films. After the test piece is conditioned in the same manner as in the case of the rigid polymer, visible rays are caused to strike thereon in the thickness direction to measure the parallel-ray transmittance thereof. The transmittance for two PET films having no polymer layer is determined as tare.

The parallel-ray transmittance of the polymer of the present invention is 80% or higher. Since the value of parallel-ray transmittance may vary depending on the state of the sample and on other factors, the measurement should be made under the constant conditions.

The polymer of the present invention preferably contains a salt of a polyvalent metal, because it enables the polymer to have higher mechanical strength (tensile strength and tear strength), be less susceptible to blocking, and retain a reduced dependence of strength and dimensions to temperature or humidity.

Examples of the polyvalent metal as a component of the salt include Group IIa metals such as beryllium, magnesium, calcium, strontium, and barium; Group IIb metals such as zinc, cadmium, and mercury; and Group IIIb metals such as boron, aluminum, gallium, indium, and thallium. Two or more of these polyvalent metals may be used in combination. Preferred of these polyvalent metals is at least one metal selected from magnesium, calcium, and zinc, because use of these polyvalent metals is advantageous from the standpoints of the tensile properties, water resistance, transparency, and cost of films comprising the polymer.

Specific examples of the polyvalent-metal salt include acetic salts such as magnesium acetate, calcium acetate, zinc acetate, cadmium acetate, and aluminum acetate; carbonic salts such as magnesium carbonate, calcium carbonate, zinc carbonate, cadmium carbonate, and aluminum carbonate; oxalic salts such as magnesium oxalate, calcium oxalate, zinc oxalate, cadmium oxalate, and aluminum oxalate; phosphoric salts such as magnesium phosphate, zinc phosphate, cadmium phosphate, and aluminum phosphate; and stearic salts such as magnesium stearate, calcium stearate, zinc stearate, cadmium stearate, and aluminum stearate.

Preferred of those polyvalent-metal salts are magnesium acetate, calcium acetate, zinc acetate, magnesium carbonate, calcium carbonate, zinc carbonate, magnesium stearate, calcium stearate, and zinc stearate, from the standpoints of the stretchability, water resistance, transparency, and homogeneity of films comprising the polymer.

The polymer of the present invention is preferably obtained by non-aqueous polymerization. Examples of the non-aqueous polymerization include solution polymerization using an organic solvent without water and bulk polymerization. The reasons for the preference for non-aqueous polymerization are that aqueous-solution polymerization is limited in the kinds of usable monomers, and that films comprising a polymer having a high acid value obtained by emulsion polymerization in an aqueous system have a heterogeneous structure and hence have poor transparency, susceptibility to whitening, and insufficient strength. Examples of polymerization techniques include anionic polymerization, cationic polymerization, and radical polymerization, with radical polymerization being preferred.

Radical polymerization initiators for use in the radical polymerization are not particularly limited. Examples thereof include azo initiators such as 2,2'-azobisisobutyronitrile and 2,2'-azobis(2,4-dimethylvaleronitrile); and peroxide initiators such as benzoyl peroxide and di-t-butyl peroxide. Two or more of these radical polymerization initiators may be used in combination.

Any solvent other than water may be used for the solution polymerization without particular limitations, as long as the solvent used does not inhibit the radical polymerization reaction. Examples of usable solvents include alcohols such as methanol, ethanol, and isopropyl alcohol; aromatic hydrocarbons such as benzene and toluene; ketones such as acetone and methyl ethyl ketone; and aliphatic esters such as ethyl acetate and butyl acetate. Two or more of these solvents may be used in combination.

Any desired reaction vessel may be used in producing the polymer of the present invention. Examples of usable reaction vessels include ordinary tank reactors, kneaders and tubular reactors such as static mixers. If desired and necessary, two or more such reactors may be used in combination. A dropping tank is used if desired.

The pressure inside the reaction vessel during the production of the polymer may be any of reduced, ordinary, and elevated pressures.

The polymer production process of the present invention is not particularly limited as long as it is a process for producing the desired polymer by non-aqueous polymerization and preferably comprises the steps of: polymerizing a first monomer mixture comprising at least 7% by weight, based on the total amount of the first monomer mixture, of an α,β-unsaturated carboxylic acid monomer and another vinyl monomer by non-aqueous polymerization to a conversion of from 20 to 80%; and adding dropwise or portion-wise a second monomer mixture comprising at least 7% by weight, based on the total amount of the second monomer mixture, of an α,β-unsaturated carboxylic acid monomer and another vinyl monomer to a non-aqueous polymerization system of the first monomer mixture, so as to further conduct polymerization, the second monomer mixture giving a polymer having a glass transition temperature different from a glass transition temperature of a polymer obtained from the first monomer mixture.

In the present invention, the Tg of the polymer to be yielded from a monomer mixture means the Tg (K) calculated from the Tg values (Tga, Tgb, Tgc, . . . ; units: K) of the homopolymers (A, B, C, . . . ) of the individual monomers using the following equation (1), which is generally and frequently used for predicting the glass transition temperature of a copolymer:

$$Tg = 1/(a/Tga + b/Tgb + c/Tgc + \ldots) \quad (1)$$

wherein a, b, c, . . . represent the weight proportions of the individual monomers A, B, C, . . . , respectively, provided that the total of a, b, c, . . . is 1.

An example of the calculation using equation (1) is as follows. In the case of a monomer mixture consisting of 80 parts by weight ethyl acrylate, 10 parts by weight of acrylic acid, and 10 parts by weight of methyl methacrylate, the Tg values of the corresponding homopolymers are 249 K, 376 K, and 378 K, respectively. Therefore, the calculated Tg of the copolymer is as follows:

$$Tg = 1/(0.8/249 + 0.1/376 + 0.1/378)$$

$$\approx 267 \text{ K}$$

$$\approx -6° \text{ C.}$$

Preferred examples of the polymer production process of the present invention include the following processes I and II, because these processes are effective in producing the desired polymer with greater ease and higher efficiency.

Process I: The first monomer mixture is polymerized in a reactor by non-aqueous polymerization to a conversion of from 20 to 80%, and the second monomer mixture which gives a polymer having a Tg different from that of the polymer yielded from the first monomer mixture is then added to the reactor dropwise or portion-wise to further conduct polymerization. Thereafter, the third and fourth monomer mixtures, etc. which give polymers having a Tg different from those of the polymers yielded from the first and second monomer mixtures are optionally added dropwise or portion-wise to conduct polymerization.

Process II: The first monomer mixture and other monomer mixtures (second, third, fourth, etc.) which give polymers having a Tg different from that of the polymer yielded from the first monomer mixture are separately polymerized by non-aqueous polymerization in respective reactors to a conversion of from 20 to 80%. Thereafter, the contents of each of the reactors for the monomer mixtures other than the first monomer mixture are added dropwise or portion-wise to the reactor for the first monomer mixture to further conduct polymerization.

In the case where the polymer of the present invention is for use especially as a film, the two processes described above are preferably carried out in such a manner that one of the polymers to be yielded from the first monomer mixture and from the other monomer mixtures (second, third, fourth, etc.) has a Tg of from −30 to 20° C. and another of these polymers has a Tg of from 50 to 120° C. This is because films obtained from the resulting polymer have high tensile strength and satisfactory anti-block properties.

At least the first and second monomer mixtures each contains at least 7% by weight α,β-unsaturated carboxylic acid monomer, preferably have such compositions that the difference in the content of the α,β-unsaturated carboxylic acid monomer between these monomer mixtures is 10% by weight or smaller. This is because a combination of such monomer mixtures yields a polymer which as a whole has satisfactory compatibility and, hence, has especially high transparency and homogeneity in properties such as solubility and water resistance. For example, in the case where the first monomer mixture contains 10% by weight α,β-unsaturated carboxylic acid monomer, the second monomer mixture and other monomer mixtures desirably have a content of an α,β-unsaturated carboxylic acid monomer of 20% by weight or lower. It is especially preferred that all the monomer mixtures have completely the same content of an α,β-unsaturated carboxylic acid, because a combination of such monomer mixtures yields a polymer having the highest level of transparency.

In the process of the present invention, the control of conversion in polymerization is important in each of processes I and II described above. Although the conversion in polymerization can be determined by any desired method, a simpler method is to use gas chromatography to measure the amount of the remaining monomers.

The Tg distribution of the polymer of the present invention, i.e., the shape of the differential curve obtained by analysis with a DSC, is determined by a balance among the mechanical strength, temperature sensitivity, transparency, and other properties of the polymer. Examples of techniques for controlling the Tg distribution of the polymer in processes I and II are described below.

In the case where the polymer to be obtained by the process of the present invention is required to have a higher level of transparency, the proportion of the area of the peak appearing in the range of from 20 to 40° C. in the differential curve is preferably increased, specifically to 5% or larger, more preferably 10% or larger. This may be accomplished, in process I, by adding the second, third and fourth monomer mixtures, etc. gradually, specifically over a period of 1 hour or larger. In process II, the desired peak area proportion may be attained by controlling the separately conducted polymerization reactions of the first, second, third and fourth monomer mixtures, etc. so that the conversion of each monomer mixture does not increase too high, specifically the conversion does not exceed 80%.

In the case where the polymer to be obtained by the process of the present invention is especially required to have reduced temperature sensitivity, the proportion of the area of the peak appearing in the range of form 20 to 40° C. in the differential curve is preferably reduced, specifically to 50% or smaller. This may be accomplished by operations contrary to the case for increasing transparency as described above. Namely, in process I, the desired peak area proportion may be attained by adding the second, third and fourth monomer mixtures, etc. at a relatively high rate, specifically in 3 hours. In process II, the desired peak area proportion may be attained by controlling the separately conducted polymerization reactions of the first, second, third and fourth monomer mixtures, etc. so as to heighten the conversion of each monomer mixture, specifically to 50% or higher.

In the case where the polymer to be obtained by the process of the present invention is especially required to have tear strength or high elongation, or have low-temperature flexibility, these properties can be imparted by increasing the height of the lower-temperature-side peak top in the differential curve. In process I, this may be attained by polymerizing the first monomer mixture to a high conversion, specifically to 40% or higher, when the first monomer mixture gives a polymer having a lower Tg; or alternatively by adding the second, third and fourth monomer mixtures, etc. gradually, specifically over a period of 1 hour or longer, when the first monomer mixture gives a polymer having a higher Tg. In process II, the desired peak top height may be attained by controlling the separately conducted polymerization reactions of the first, second, third and fourth monomer mixtures, etc. so as to heighten the conversion of each monomer mixture, specifically to 50% or higher.

In the case where the polymer to be obtained by the process of the present invention is especially required to have tensile strength and anti-block properties, these properties can be imparted by increasing the height of the higher-temperature-side peak top in the differential curve. In process I, this may be attained by polymerizing the first monomer mixture to a high conversion, specifically to 40% or higher, when the first monomer mixture gives a polymer having a higher Tg; or alternatively by adding the second, third and fourth monomer mixtures, etc. gradually, specifically over a period of 1 hour or longer, when the first monomer mixture gives a polymer having a lower Tg. In process II, the desired peak top height may be attained by controlling the separately conducted polymerization reactions of the first, second, third and fourth monomer mixtures, etc. so as to heighten the conversion of each monomer mixture, specifically to 50% or higher.

As described above, in the process of the present invention, a balance among the mechanical strength, transparency, anti-block properties, and temperature sensitivity of a polymer can be designed according to uses for the polymer by controlling conversion and adding rate in the polymerization.

In the case where processes I and II described above contain the step of further mixing a polyvalent-metal salt, a metal-crosslinked polymer is obtained. Due to the crosslinking, films formed from the polymer have higher mechanical strength (tensile strength and tear strength), higher anti-block properties, and a reduced dependence of strength and dimensional stability to temperature or humidity. The polyvalent-metal salt used for the metal crosslinking is not particularly limited, and examples thereof include the polyvalent-metal salts enumerated hereinabove. Preferred polyvalent-metal salts are also the same as those enumerated hereinabove. As modes of the step of mixing a polyvalent-metal salt, a powder, solution, or slurry of the polyvalent-metal salt may be added to a solution of the polymer, and a powder, solution, or slurry of the salt may be added during the kneading of the polymer with volatile removal.

The film of the present invention comprising the polymer of the present invention is described below.

The polymer for forming the film of the present invention preferably has a number-average molecular weight of from 50,000 to 200,000, because such a molecular weight imparts high mechanical strength and excellent formability to the film. The film may contain a filler, a plasticizer, a lubricant, a colorant, and other ingredients according to need. Although such additive ingredients may impair the transparency of the film in some degree, the additive-containing film can be satisfactorily used in applications where transparency is not very important.

Examples of the filler include kaolin, asbestos, and mica. Although the filler may be incorporated in any desired amount according to purpose, the incorporation amount thereof is preferably from 0.1 to 10 parts by weight per 100 parts by weight of the polymer.

Examples of the plasticizer include dioctyl phthalate and tributyl acetylcitrate. The incorporation amount of the plasticizer is preferably from 1 to 50 parts by weight per 100 parts by weight of the polymer.

Examples of the lubricant include stearyl alcohol, stearic acid, stearamide, and calcium stearate. The incorporation amount of the lubricant is preferably from 0.1 to 30 parts by weight per 100 parts by weight of the polymer.

Examples of the colorant include various pigments such as aluminum, titanium oxide, zinc oxide, chrome yellow, ultramarine, and carbon black; and various dyes such as azo dyes, anthraquinone dyes, and phthalocyanine dyes. The incorporation amount of the colorant is preferably from 0.1 to 10 parts by weight per 100 parts by weight of the polymer.

The film of the present invention may be produced by (a) the so-called casting method in which a solution of the polymer is applied and the solvent contained in the coating film is then removed by evaporation at ordinary temperature or with heating; or by (b) molding the polymer into a sheet form.

In the method in which a solution of the polymer is used, the coating film preferably has a uniform thickness in order that the film to be obtained have evenness of mechanical strength. For maintaining a constant coating film thickness, an ordinarily employed coating apparatus is used, such as, e.g., a roll coater, reverse-roll coater, gravure coater, or bar coater. A solution of the polymer is applied on the surface of a paper, film, etc. with such a coating apparatus, and the solvent contained in the coating film is evaporated, whereby the film of the present invention can be produced. If the coated surface of the paper, film, etc. has releasing properties, the coating film can be separated from that surface, giving an unsupported film. If the coated surface of the paper, film, etc. has no releasing property and the coating film adheres to that surface, a laminated film and a coated paper can be obtained.

Examples of the method for molding the polymer into a sheet form include extrusion molding techniques in which the polymer is melted and extruded with an extruder, such as T-die molding, inflation molding, blow molding, and laminating molding, and further include calendering. If desired and necessary, the film obtained may be stretched monoaxially or biaxially.

Although the thickness of the film is not particularly limited, it is generally from 10 to 200 $\mu$m. From the standpoint of the strength and formability of the film, the thickness thereof is preferably from 30 to 100 $\mu$m.

The film of the present invention has the following characteristics:

(i) It is printable because it comprises vinyl polymers.

(ii) It undergoes little change in strength with changing temperature because it has the broad and specified Tg distribution over low temperatures to high temperatures.

(iii) It is less susceptible to blocking at high temperatures because of its high cohesive power and the presence of the high Tg component.

(iv) It is highly flexible at low temperatures because of the presence of the low Tg component.

(v) It has high tensile strength because of its high cohesive power and the presence of the high Tg component.

(vi) It has high tear strength because of its high cohesive power and the presence of the low Tg component.

(vii) It is less susceptible to whitening upon stretching because of its uniformity.

(viii) It is soluble in water and/or alkali solutions, and/or swells in water and/or alkali solutions because of its high acid value.

(ix) It has excellent transparency because of its uniformity.

Due to these properties, the film is usable in various applications as described below in detail.

The label of the present invention comprising the polymer of the present invention is described below.

The label of the present invention, in one embodiment thereof, consists only of a label base comprising the film described above. In another embodiment, the label of the present invention comprises the label base and an adhesive such as a pressure-sensitive adhesive.

For use as a label base, the film is required to have a tensile strength sufficient to withstand the tension imposed during printing. The film preferably has a uniform thickness of 30 $\mu$m or larger.

Preferred methods for producing the label base include blow molding, T-die extrusion molding, and casting.

The label consisting only of a label base obtained can be applied by attaching the same to a substrate to which the label is adhered and heat-sealing the same. Thus, the label base by itself can be used as a label for, e.g., a glass bottle, PET bottle, etc. The label base applied can be easily removed by an alkali treatment after use. The polymer constituting the label base preferably has an acid value of 90 mgKOH/g or higher from the standpoint of enabling rapid removal of the label base. The acid value thereof is preferably 250 mgKOH/g or lower from the standpoint of imparting excellent water resistance.

The label base described above may be combined with any of various adhesives such as pressure-sensitive adhesives to give a label. The label may be a dissolution type label which is removed through dissolution, or may be a peeling type label which peels off without undergoing dissolution.

The adhesive may contain any of various crosslinking agents, tackifiers, and plasticizers. The thickness of the adhesive layer is preferably from 10 to 50 $\mu$m.

When a label comprising a combination of the above-described label base of the alkali-soluble type and a water-soluble and/or alkali-soluble adhesive e.g., glue, polyvinyl alcohol, or an acrylic pressure-sensitive adhesive, is applied to a glass bottle, PET bottle, or the like, the applied label can be easily removed by an alkali treatment after use. Although the washing solution which has been used for the alkali treatment contains the dissolved polymer of the present invention and other substances, it can be treated by a neutralization treatment, for example, by pouring the same into an acidic water, e.g., dilute hydrochloric or sulfuric acid, upon which the dissolved polymer of the present invention precipitates rapidly. Since the polymer of the present invention contains a polymer component having a high Tg, the polymer precipitated is not tacky and can hence be easily filtered off. The thus-treated washing solution can be discarded without posing a problem.

A film that does not dissolve in hot water and/or aqueous alkali solutions but just swells therein can be used as a label base for the label of the present invention. Examples of such a film include the following films.

(a) A film comprising a polymer obtained by crosslinking a polymer of the present invention (acid value: 90 mgKOH/g or higher) by reaction with, for example, a polyvalent-metal salt, a polyfunctional compound, e.g., ethylene glycol or ethylene glycol diglycidyl ether, or a polyfunctional polymer, e.g., a polymer containing hydroxyl groups, a polymer containing amide groups, a polymer containing oxazoline groups, a melamine resin, or an epoxy resin.

(b) A film comprising a polymer of the present invention which has a relatively low acid value of from 50 to 90 mgKOH/g.

Further examples of a film according to the present invention that swells in hot water and/or aqueous alkali solutions include (i) a film comprising a polymer of the present invention that contains a relatively large amount of hydrophobic structural units, such as those derived from styrene and stearyl acrylate; and (ii) a film comprising a polymer according to the present invention that contains a relatively large amount of hydrophobic compounds, such as stearyl alcohol. The desired content of the hydrophobic structural units or the hydrophobic compounds varies depending on the acid value of the polymer and is preferably at least 5% by weight based on the weight bf the film.

Each of these films may be thought to give a label base which is less water-permeable as compared with label bases which dissolve in aqueous alkali solutions. However, since the polymer of the present invention contains a polymer component having a low Tg, the label base made of any of the above-described films is far more permeable to aqueous alkali solutions than conventional label bases made of a polymer having a Tg of from 20 to 40° C. Consequently, an aqueous alkali solution can rapidly reach the pressure-sensitive adhesive layer, resulting in speedy peeling of the whole label.

The adhesive used in combination with such a label base may be water-soluble and/or alkali-soluble. It is preferred to use a pressure-sensitive adhesive which does not dissolve in aqueous alkali solutions but absorbs water therein to lose its tackiness or swells therein by the action of water or heat to peel off.

Use of a label comprising a combination of the label base comprising the polymer of the present invention that only swells in an aqueous alkali solution and a pressure-sensitive adhesive that does not dissolve in the aqueous alkali solution completely eliminates the necessity of the treatment such as neutralization necessary for the disposal of the alkali washing solution. Thus, a simple and economical alkali washing step can be established.

The packaging bag of the present invention comprising the polymer of the present invention is described below.

The packaging bag of the present invention comprises the film described above. This film generally has a thickness of from 10 to 200 $\mu$m. The thickness thereof is preferably 30 $\mu$m or larger when mechanical strength is required, and it is preferably 100 $\mu$m or smaller when rapid dissolution is required.

For use as a packaging bag, the film is required to be excellent in heat sealability, elongation, tensile strength, and tear strength. In addition, since the film is especially required to have excellent solubility, the acid value thereof is preferably 70 mgKOH/g or higher, more preferably 100 mgKOH/g or higher.

The packaging bag can be produced by heat-sealing the film obtained by any of various molding techniques. Preferred of these molding techniques is blow molding, which is the simplest.

The size of the packaging bag is not particularly limited, and can be freely selected according to uses for the bag. Since the packaging bag thus obtained is water-soluble and/or alkali-soluble, it is especially useful as a bag for the individual packaging of an agricultural chemical, a detergent, etc., a laundry bag, or the like. In such applications, the packaging bag can not only save the trouble of opening the bag and taking out the contents, but also prevent human bodies from damages due to those chemicals.

The coating material of the present invention comprising the polymer of the present invention is described below.

The coating material of the present invention comprises the polymer described above and an organic solvent. The polymer preferably has a number-average molecular weight of from 10,000 to 100,000, because the polymer gives a coating film having excellent mechanical strength and imparts excellent applicability to the coating material. The coating material may contain additive ingredients in addition to the polymer and the solvent according to need.

While any of the polymers described hereinabove may be used, the polymer containing a polyvalent-metal salt is preferred because it gives a film having further improved mechanical strength and anti-block properties.

Examples of the organic solvent include alcohols such as methanol, ethanol, and isopropyl alcohol; aromatic hydrocarbons such as benzene and toluene; ketones such as acetone and methyl ethyl ketone; and aliphatic esters such as ethyl acetate and butyl acetate.

Examples of the additive ingredients include fillers, plasticizers, and lubricants, which may be suitably incorporated. The fillers, plasticizers, and lubricants enumerated hereinabove with regard to the film may be used for the coating material.

By applying the coating material of the present invention to the surface of various articles to be coated, a coating film is formed on that surface. Examples of the articles to be coated include films, papers, sheets, metal plates, and concrete. Use of the coating material of the present invention for film or paper coating is especially preferred in that not only the application thereof imparts gloss and other properties but also the coated paper or the like can be recycled after use.

In the case where that surface of articles to be coated with the coating material of the present invention has releasing properties, peeling the coating film from the surface of the articles gives a film of the present invention.

In addition to the above-described film, label, packaging bag, and coating material, the polymer of the present invention can be applied to various materials, which are described below.

By laminating the film described above and paper, a reclaimable coated paper can be obtained.

The paper contained in the reclaimable coated paper is not particularly limited. Examples thereof include plain paper, wood-free paper, kraft paper, and glassine paper.

Although the thickness of the film is not particularly limited, it is preferably from 10 to 100 $\mu$m.

For use as a reclaimable paper, the film preferably has an acid value of 70 mgKOH/g or higher.

Methods for producing the reclaimable coated paper are not particularly limited. The coated paper may be obtained by laminating a film to paper. Examples of usable production methods include (a) a method comprising coating or impregnating a paper with the coating material of the present invention with a coater, e.g., a roll coater or a gravure coater, and then evaporating the solvent; and (b) a method in which the volatile component is removed from the coating material of the present invention to obtain a polymer composition and the composition is extrusion-molded with a T-die and simultaneously laminated to paper.

The reclaimable coated paper is free from blocking and undergoes little deformation. When the coated paper is stirred in neutral water or in an aqueous alkali solution, e.g., 1% aqueous sodium hydroxide solution, the laminated film is easily removed and the paper disaggregates into reclaimable fibers.

By printing the film of the reclaimable coated paper, a reclaimable paper label base is obtained.

Any printing technique can be used without particular limitations. Examples of printing inks usable for the printing include letterpress inks, lithographic inks, gravure inks, flexographic inks, screen printing inks, intaglio printing inks, thermal transfer printing inks, and resist inks.

Similar to the reclaimable coated paper, the reclaimable paper label base is free from blocking, undergoes little deformation, and when stirred in neutral water or in an aqueous alkali solution, e.g., 1% aqueous sodium hydroxide solution, the laminated film is easily removed and reclaimable fibers of the disaggregated paper are obtained.

By forming a release agent layer on the film of the reclaimable coated paper described above, a reclaimable release paper is obtained.

Examples of the release agent include silicone resins, fluororesins, and acrylic resins. For forming a release agent layer on the reclaimable coated paper, for example, the release agent may be dispersed in an organic solvent, e.g., toluene, and the dispersion may be applied and dried. While the thickness of the release agent layer is not particularly limited, a preferred range thereof is, for example, from 0.5 to 5 μm, because a release agent layer with such a thickness can have sufficient releasing ability and adhesion to the substrate film and can be formed through one coating operation.

The film of the present invention can be laminated to a water-soluble film made of, e.g., polyvinyl alcohol, polyethylene oxide and polydioxolane; a hydrophobic resin, e.g., a polyolefin, a polyester and a fluororesin; etc.

The laminated film thus obtained is exceedingly useful, because not only strength, gloss, and other properties have been imparted thereto, but also the laminated film can be reused after treatment of the coating layer with neutral or alkaline water.

The present invention will be explained below in more detail by reference to the following Examples. However, these Examples are intended to illustrate the invention and should not be construed as limiting the scope of the claims of the invention. In the following Examples and Comparative Examples, all "parts" and "percents" are by weight.

EXAMPLE 1

Into a tank reactor having a capacity of 50 L was introduced a monomer mixture A consisting of 2.4 kg of ethyl acrylate, 0.45 kg of acrylic acid, 0.15 kg of methyl methacrylate, 3 kg of methanol, and 12 g of 2,2'-azobis(2,4-dimethylvaleronitrile) (calculated Tg of the polymer to be yielded from the monomer mixture A: −6° C.). In a nitrogen atmosphere, the monomer mixture A was heated to 65° C. and polymerized to a conversion of 72% for 20 minutes. Subsequently, a monomer mixture B consisting of 2.1 kg of methyl acrylate, 1.05 kg of acrylic acid, 3.85 kg of methyl methacrylate, 7 kg of methanol, and 28 g of 2,2'-azobis(2,4-dimethylvaleronitrile) (calculated Tg of the polymer to be yielded from the monomer mixture B: 70° C.) was added dropwise at a constant rate over a period of 2 hours to successively conduct polymerization at 65° C. After completion of the addition, the polymerization was continued at 65° C. for further 2 hours for aging. As a result, coating material (1) was obtained which contained a polymer having a number-average molecular weight of $9.2 \times 10^4$ and, upon analysis with a DSC, giving the differential DSC curve (DDSC) 2 shown in FIGURE. In the differential curve, the ratio of the height of the peak top appearing on the lower-temperature side 4 (14.4° C.; 93 μW/min; half value width a: 12.1° C.) to the height of the peak top appearing on the higher-temperature side 5 (57.9° C.; 247 μW/min; half value width b: 12.9° C.) was about 1/3. In FIGURE, numeral 1 denotes the DSC curve (DSC) and 3 denotes the base line.

Coating material (1) obtained was heated in a twin-screw extruder at a reduced pressure to remove volatile contents therefrom. The polymer thus obtained was molded with a T-die at 200° C. to obtain a film. The film as a label base was analyzed with a DSC and examined for mechanical strength and other properties by the following methods. The results obtained are shown in Table 1.

Analysis with DSC

A 10-mg sample was analyzed with a differential scanning calorimeter (DSC 22° C., manufactured by Seiko Denshi Kogyo K.K., Japan) in a nitrogen atmosphere under the following conditions. The sample was heated to 150° C. and then maintained at this temperature for 5 minutes. The sample was thereafter quenched to −100° C. and maintained at this temperature for 5 minutes. Subsequently, the sample was heated to 150° C. at a rate of 10° C./min to obtain a DSC curve and a DSC differential curve. The results obtained are shown in FIGURE. A line was drawn through the points where the differential value was 0 μW/min to form a base line for the differential curve.

In FIGURE, numeral 1 denotes the DSC curve, 2 denotes the differential DSC (DDSC) curve, 3 denotes a base line, 4 denotes a lower-temperature-side peak top, and 5 denotes a higher-temperature-side peak top.

Tensile Strength, Elongation and Temperature Sensitivity

Tests were performed in accordance with JIS K7127.

The test under conditions 1 was performed in a 23° C. 55% RH atmosphere using a sample film having a thickness of 50 μm at a pulling rate of 200 mm/min.

The tests under conditions 2 and conditions 3 were performed in a 10° C. 55% RH atmosphere and a 40° C. 55% RH atmosphere, respectively, with the other conditions being the same as in the test under conditions 1. Thus, tensile strength was measured to evaluate temperature sensitivity.

Tear Strength

A test was performed in accordance with JIS K7128. A sample film having a thickness of 50 μm was tested at a pulling rate of 200 mm/min.

Transparency

Using turbidimeter ND-1001DP, manufactured by Nippon Denshoku Kogyo K.K., a test piece having a thickness of 65 μm was irradiated with visible rays in a thickness direction perpendicular to the film. The transparency of the test piece was evaluated in terms of the parallel-ray transmittance thus determined.

Whitening

The appearance of a sample during the tensile strength measurement made under conditions 1 was examined to evaluate whitening based on the following criteria.

A: whitening occurred immediately before breakage.
B: whitening occurred before the elongation reached 150%.
C: whitening occurred before the elongation reached 100%.

Degree of Shrinkage

A dimensional change through 72-hour standing in a 30° C. 80% RH atmosphere was measured.

Anti-Block Property

A rolled film was allowed to stand at 50° C. to evaluate the degree of blocking based on the following criteria.

AA: capable of being easily rewound.
A: capable of being rewound with slight resistance.
B: partly incapable of being rewound.
C: entirely incapable of being rewound.

Acid Value

Using an automatic titrator (COMTE-980, manufactured by Hiranuma Sangyo K.K., Japan) a solution of 1 g of a film in 100 g of methanol was titrated with 0.1 N aqueous sodium hydroxide solution to determine the acid value of the film.

Removability with Alkali

A label was applied to a bottle by heat-sealing both ends of the label which had been wound around the bottle so as to make one lap. The labeled bottle was immersed in 0.4% aqueous sodium hydroxide solution at 25° C. to measure the time required for the label to dissolve away or be removed.

Solubility in Neutral and Acidic Waters 10 g of a film was immersed in each of ion-exchanged water and 0.1 N hydrochloric acid for 24 hours at 25° C. and then dried to measure the resulting weight losses. The water resistance of the film was evaluated in terms of the dissolution amounts (%) thus determined.

Print Image

Offset printing was conducted with printing tester Type RI-1, and the appearance (the degree of offset double, rumpling, and blurring) was examined. The print image was evaluated based on the following criteria.

AA: excellent
A: good
B: slightly poor
C: poor

Ink Fixability

Using an ink (F-Gloss, manufactured by Dainippon Ink & Chemicals, Inc., Japan), offset printing was conducted with printing tester Type RI-1. At 10 minutes after the printing, wood-free paper was superposed on the printed surface with application of a pressure, and the ink transferred to the wood-free paper was examined for density. The ink fixability was evaluated based on the following criteria.
A: entirely free from transfer.
B: slightly transferred.
C: transferred in a large amount.

EXAMPLE 2

Using the same compositions as in Example 1, polymerization was carried out in the same manner as in Example 1, except that the polymerization of the monomer mixture A was conducted to a conversion of 40% for 10 minutes, before the monomer mixture B was added dropwise. As a result, coating material (2) was obtained which contained a polymer having a number-average molecular weight of $9.8 \times 10^4$ and, upon analysis with a DSC, giving a differential curve in which the ratio of the height of the peak top appearing on the lower-temperature (14.1° C.) side to the height of the peak top appearing on the higher-temperature (52.3° C.) side was about 1/9.

Coating material (2) obtained was treated with a twin-screw extruder to remove the volatile matter therefrom in the same manner as in Example 1, and then molded with a T-die at 210° C. to obtain a film. The film was evaluated, as a label base, for mechanical strength and other properties by the same methods as in Example 1. The results obtained are shown in Table 1.

EXAMPLE 3

To coating material (1) obtained in Example 1 was added a toluene dispersion of 400 g of calcium stearate. After being homogenized by stirring, the mixture was heated to 60° C. and stirred for 30 minutes to obtain coating material (3). Coating material (3) obtained was applied to a release paper with a 5-mil applicator, and the coating was dried in a hot-air drying oven first at 25° C. for 1 hour and then at 150° C. for 1 hour. The film layer thus formed was peeled from the release paper to obtain a film. The film was evaluated, as a label base, for mechanical strength and other properties by the same methods as in Example 1. The results obtained are shown in Table 1.

COMPARATIVE EXAMPLE 1

Using a tank reactor having a capacity of 50 L, the monomer mixtures A and B used in Example 1 were mixed with each other and polymerized simultaneously over a period of 2 hours with heating at 65° C. in a nitrogen atmosphere. As a result, comparative coating material (1) was obtained which contained a polymer having a number-average molecular weight of $10.3 \times 10^4$ and a Tg of 39° C. Comparative coating material (1) was treated with a twin-screw extruder to remove volatile contents therefrom in the same manner as in Example 1, and then molded with a T-die at 220° C. to obtain a film. The film was evaluated, as a label base, for mechanical strength and other properties by the same methods as in Example 1. The results obtained are shown in Table 1.

COMPARATIVE EXAMPLE 2

For the purpose of comparison with a polymer blend, the following experiment was performed. In a nitrogen atmosphere, the monomer mixtures A and B used in Example 1 were separately heated to 65° C. and polymerized for 2 hours to a conversion of 95% or higher. As a result, the monomer mixture A yielded a solution containing a polymer having a number-average molecular weight of $12.1 \times 10^4$ and a Tg of 13° C., while the monomer mixture B yielded a solution containing a polymer having a number-average molecular weight of $8.2 \times 10^4$ and a Tg of 65° C. These polymer-containing solutions were mixed to obtain comparative coating material (2). Comparative coating material (2) was treated with a twin-screw extruder to remove volatile contents therefrom in the same manner as in Example 1, and then molded with a T-die at 220° C. to obtain a film. The film was evaluated, as a label base, for mechanical strength and other properties by the same methods as in Example 1. The results obtained are shown in Table 1.

COMPARATIVE EXAMPLE 3

For the purpose of comparison with an emulsion polymerization product, the following experiment was performed. Into a tank reactor having a capacity of 50 L was introduced a comparative monomer mixture A consisting of 2.4 kg of ethyl acrylate, 0.45 kg of acrylic acid, 0.15 kg of methyl methacrylate, 3 kg of water, 45 g of sodium lauryl sulfate, 7.5 g of ammonium persulfate, and 90 g of bromotrichloroethane. In a nitrogen atmosphere, the comparative monomer mixture A was heated to 80° C. and polymerized to a conversion of 69%. Subsequently, a comparative monomer mixture B consisting of 2.1 kg of methyl acrylate, 1.05 kg of acrylic acid, 3.85 kg of methyl methacrylate, 7 kg of water, 105 g of sodium lauryl sulfate, 17.5 g of ammonium persulfate, and 210 g of bromotrichloroethane was added dropwise at a constant rate over a period of 2 hours to successively conduct polymerization at 80° C. After completion of the addition, the polymerization was continued at 80° C. for further 2 hours for aging. As a result, comparative coating material (3) comprising a polymer emulsion was obtained. Comparative coating material (3) was formed into a film by the casting method. The film was evaluated, as a label base, for mechanical strength and other properties by the same methods as in Example 1. The results obtained are shown in Table 1.

COMPARATIVE EXAMPLE 4

For the purpose of comparison with a polymer having a low acid value, the following experiment was performed. Into a tank reactor having a capacity of 50 L was introduced a comparative monomer mixture C consisting of 2.4 kg of ethyl acrylate, 0.15 kg of acrylic acid, 0.45 kg of methyl methacrylate, 3 kg of methanol, and 12 g of 2,2'-azobis(2,4-dimethylvaleronitrile). In a nitrogen atmosphere, the comparative monomer mixture C was heated to 65° C. and polymerized to a conversion of 68% for 30 minutes. Subsequently, a comparative monomer mixture D consisting of 2.1 kg of methyl acrylate, 0.35 kg of acrylic acid, 4.55 kg of methyl methacrylate, 7 kg of methanol, and 28 g of 2,2'-azobis(2,4-dimethylvaleronitrile) was added dropwise at a constant rate over a period of 2.5 hours to successively conduct polymerization at 65° C. After completion of the addition, the polymerization was continued at 65° C. for further 2 hours for aging. As a result, comparative coating material (4) containing a polymer having a number-average molecular weight of $8.1 \times 10^4$ was obtained. Comparative coating material (4) was treated with a twin-screw extruder to remove volatile contents therefrom in the same manner as in Example 1, and then molded with a T-die at 190° C. to obtain a film. The film was evaluated, as a label base, for mechanical strength and other properties by the same methods as in Example 1. The results obtained are shown in Table 1.

TABLE 1

|  | Example | | | Comparative Example | | | |
| --- | --- | --- | --- | --- | --- | --- | --- |
|  | 1 | 2 | 3 | 1 | 2 | 3 | 4 |
| Tensile strength (kgf/mm$^2$) | | | | | | | |
| Conditions 1 | 4.6 | 5.1 | 4.9 | 3.2 | 2.8 | 4.1 | 4.3 |
| Conditions 2 | 5.1 | 5.5 | 5.4 | 4.5 | 3.5 | 4.5 | 4.6 |
| Conditions 3 | 4.4 | 4.9 | 4.5 | 2.2 | 2.0 | 3.6 | 3.9 |
| Elongation (%) | 230 | 190 | 250 | 170 | 90 | 150 | 200 |
| Tear strength (kgf/mm) | 0.39 | 0.34 | 0.41 | 0.29 | 0.12 | 0.27 | 0.31 |
| Parallel-ray transmittance (%) | 89 | 91 | 86 | 92 | 29 | 62 | 90 |
| Whitening | A | A | A | A | C | B | A |
| Degree of shrinkage (%) | 7 | 7 | 5 | 4 | 10 | 13 | 7 |
| Anti-blocking property | A | AA | AA | C | B | A | A |
| Acid value (mgKOH/g) | 117 | 118 | 113 | 118 | 117 | 109 | 39 |
| Removability of alkali | 5 | 6 | 5 | 16 | ≧60 | 14 | ≧60 |
| Dissolution amount (%) | | | | | | | |
| Water | 0.5 | 0.4 | 0.6 | 0.5 | 0.6 | 5.3 | 0.1 |
| 0.1N Hydrochloric acid | 0.5 | 0.5 | 0.7 | 0.6 | 0.6 | 4.8 | 0.2 |
| Print image | AA | AA | AA | A | B | B | B |
| Ink fixability | A | A | A | A | B | B | B |

Table 1 shows the following. The films obtained in Examples 1 to 3 were excellent in mechanical strength and dimensional property, had anti-block properties and satisfactory printability, and were most suitable for use as a label base. These films were reduced in strength change with changing temperature as compared with the polymer obtained in Comparative Example 1 through simultaneous polymerization, and had a higher tear strength, elongation, etc., better transparency, and reduced susceptibility to whitening upon stretching as compared with the polymer blend obtained in Comparative Example 2 and the emulsion polymerization product obtained in Comparative Example 3. Further, the films according to the present invention were characterized as being superior in water resistance to the emulsion polymerization product. Furthermore, unlike the label base of Comparative Example 4, the label bases of the present invention could be easily removed by the alkali treatment after use and were hence exceedingly useful.

In addition, the results obtained in Examples 1 and 2 show that mechanical strength and other properties can be freely designed based on the proportion of peak tops.

EXAMPLE 4

Pressure-sensitive adhesive composition (i) synthesized by the method described below was applied to a release paper and dried to form a pressure-sensitive adhesive layer having a thickness of 25 μm. The 60 μm-thick film obtained in Example 1 was adhered to the pressure-sensitive adhesive layer with application of a pressure to obtain a label sheet. A test piece having dimensions of 10 cm by 10 cm was cut out of the label sheet. The label was peeled from the release paper and applied to an ordinary beer bottle (diameter, 7 cm) made of glass. The labeled beer bottle was immersed in 5 L of 0.4% aqueous sodium hydroxide solution at 25° C. with stirring to examine the state of the label. The results obtained are shown in Table 2.

Synthesis of Pressure-Sensitive Adhesive Composition (i)

Into a tank reactor having a capacity of 5 L were introduced 0.8 kg of butyl acrylate, 0.2 kg of acrylic acid, 3 g of 2,2'-azobisisobutyronitrile, and 1 kg of ethyl acetate. In a nitrogen atmosphere, the contents were heated to 80° C. and polymerized for 2 hours. To the polymer solution thus obtained was added 200 g of polyethylene glycol having a weight-average molecular weight of 1,000. Thus, pressure-sensitive-adhesive composition (i) was obtained.

EXAMPLE 5

To coating material (1) obtained in Example 1 was added 181.25 g of ethylene glycol diglycidyl ether. The mixture was stirred to obtain coating material (4). Coating material (4) obtained was treated with a twin-screw extruder to remove volatile contents therefrom in the same manner as in Example 1, and then molded with a T-die at 240° C. to obtain a film. Using the film and pressure-sensitive adhesive composition (ii) synthesized by the method described below, a label was produced in the same manner as in Example 4. The label was applied to a beer bottle, and the labeled bottle was immersed in 5 L of 0.4% aqueous sodium hydroxide solution at 25° C. with stirring to examine the state of the label. The results obtained are shown in Table 2.

Synthesis of Pressure-Sensitive Adhesive Composition (ii)

Into a tank reactor having a capacity of 5 L were introduced 0.9 kg of butyl acrylate, 0.1 kg of acrylic acid, 3 g of 2,2'-azobisisobutyronitrile, and 1 kg of ethyl acetate. In a nitrogen atmosphere, the contents were heated to 80° C. and polymerized for 2 hours. Thus, pressure-sensitive-adhesive composition (ii) was obtained.

EXAMPLE 6

Into a tank reactor having a capacity of 50 L was introduced a monomer mixture C consisting of 3.72 kg of ethyl acrylate, 0.28 kg of acrylic acid, 4 kg of ethyl acetate, and 8 g of 2,2'-azobisisobutyronitrile (calculated Tg of the polymer to be yielded from the monomer mixture C: −18° C.). In a nitrogen atmosphere, the monomer mixture C was heated to 80° C. and polymerized to a conversion of 61% for 30 minutes. Subsequently, a monomer mixture D consisting of 1.2 kg of ethyl acrylate, 0.42 kg of acrylic acid, 4.38 kg of methyl methacrylate, 6 kg of ethyl acetate, and 12 g of 2,2'-azobisisobutyronitrile (calculated Tg of the polymer to be yielded from the monomer mixture D: 69° C.) was added dropwise at a constant rate over a period of 3 hours to successively conduct polymerization at 80° C. After completion of the addition, the polymerization was continued at 80° C. for further 2 hours for aging. As a result, a solution of a polymer was obtained which polymer had a number-average molecular weight of $6.8 \times 10^4$ and an acid value of 55 mgKOH/g, and upon analysis with a DSC, gave a differential curve in which the ratio of the height of the peak top appearing on the lower-temperature side (1.8° C.) to the height of the peak top appearing on the higher-temperature side (71.3° C.) was about 4/6. To the solution was added 100 g of stearamide. The mixture was stirred to obtain coating material (5).

Coating material (5) obtained was heated in a twin-screw extruder at a reduced pressure to remove volatile contents therefrom. The composition thus obtained was blow-molded at 160° C. to obtain a film. Using the film and pressure-sensitive adhesive composition (ii) synthesized in Example 5, a label was produced in the same manner as in Example 4. The label was applied to a beer bottle, and the labeled bottle was immersed in 5 L of 0.4% aqueous sodium hydroxide solution at 25° C. with stirring to examine the state of the label. The results obtained are shown in Table 2.

COMPARATIVE EXAMPLE 5

Using a commercial poly(ethylene terephthalate) (PET) film (thickness: 50 μm) and pressure-sensitive-adhesive composition (i) synthesized in Example 4, a label was produced in the same manner as in Example 4. The label was applied to a beer bottle, and the labeled bottle was immersed in 5 L of 0.4% aqueous sodium hydroxide solution at 25° C. with stirring to examine the state of the label. The results obtained are shown in Table 2.

TABLE 2

| | State of label |
|---|---|
| Example 4 | dissolved away in 7 minutes |
| Example 5 | peeled off in 8 minutes without dissolution |
| Example 6 | peeled off in 6 minutes without dissolution |
| Comparative Example 5 | remained unpeeled |

Table 2 shows that the label of the present invention can be easily removed from substrates, e.g., bottles, by treatment with a weakly alkaline aqueous solution, and is hence of great significance.

EXAMPLE 7

Into a tank reactor having a capacity of 50 L was introduced a monomer mixture E consisting of 1.8 kg of methyl acrylate, 0.61 kg of acrylic acid, 1.6 kg of methyl methacrylate, 5 kg of methanol, and 32 g of 2,2'-azobis(2,4-dimethylvaleronitrile) (calculated Tg of the polymer to be yielded from the monomer mixture E: 55° C.). In a nitrogen atmosphere, the monomer mixture E was heated to 65° C. and polymerized to a conversion of 73% for 45 minutes. Subsequently, a monomer mixture F consisting of 2.3 kg of ethyl acrylate, 0.4 kg of acrylic acid, 3.3 kg of methanol, and 22 g of 2,2'-azobis(2,4-dimethylvaleronitrile) (calculated Tg of the polymer to be yielded from the monomer mixture F: –11° C.) was added dropwise at a constant rate over a period of 1.5 hours to successively conduct polymerization at 65° C. After completion of the addition, the polymerization was continued at 65° C. for further 2 hours for aging. As a result, coating material (6) was obtained which contained a polymer having a number-average molecular weight of $7.2 \times 10^4$ and, upon analysis with a DSC, giving a differential curve in which the ratio of the height of the peak top appearing on the lower-temperature side (18.7° C.) to the height of the peak top appearing on the higher-temperature side (53.1° C.) was 1/1.

Coating material (6) was treated with a twin-screw extruder to remove volatile contents therefrom in the same manner as in Example 1, and then blow-molded at 180° C. to obtain a film in the form of a bag. The film was evaluated, as a packaging bag, for mechanical strength and other properties by the same methods as in Example 1 and by the following methods. The results obtained are shown in Table 3.

Solubility in Aqueous Detergent Solution and Water

A 0.25 g of a film was immersed in a 50° C. aqueous detergent solution prepared by dissolving 5 g of a powdery detergent ("Atakku", manufactured by Kao Corp., Japan) in 1 L of tap water. The time required for the film to dissolve into the solution with stirring was measured. The same test was performed using tap water alone in place of the detergent solution.

Heat Sealability

Two sheets (size: 5 cm×5 cm) of a film were superposed on each other and heat-sealed by applying a 200° C. heat sealer for 1 second. The force required to peel the heat-sealed sheets apart was measured.

EXAMPLE 8

Into a tank reactor having a capacity of 50 L was introduced a monomer mixture G consisting of 4.0 kg of ethyl acrylate, 1.0 kg of acrylic acid, 5 kg of methanol, and 10 g of 2,2'-azobis(2,4-dimethylvaleronitrile) (calculated Tg of the polymer to be yielded from the monomer mixture G: –6° C.). In a nitrogen atmosphere, the monomer mixture G was heated to 65° C. and polymerized to a conversion of 72% for 25 minutes. Subsequently, a monomer mixture H consisting of 1.25 kg of ethyl acrylate, 1.25 kg of acrylic acid, 2.5 kg of methyl methacrylate, 5 kg of methanol, and 10 g of 2,2'-azobis(2,4-dimethylvaleronitrile) (calculated Tg of the polymer to be yielded from the monomer mixture H: 62° C.) was added in twelve equal portions at an interval of 10 minutes to successively conduct polymerization at 65° C. After completion of the portion-wise addition, the polymerization was continued at 65° C. for further 2 hours for aging. In this Example, the acrylic acid content of the monomer mixture G was 20% and that of the monomer mixture H was 25%. As a result, a solution of a polymer was obtained which polymer had a number-average molecular weight of $7.5 \times 10^4$ and, upon analysis with a DSC, gave a differential curve in which the ratio of the height of the peak top appearing on the lower-temperature side (12.2° C.) to the height of the peak top appearing on the higher-temperature side (56.1° C.) was about 6/4. To the solution was added 400 g of stearamide. The mixture was stirred to obtain coating material (7).

Coating material (7) obtained was heated in a twin-screw extruder at a reduced pressure to remove volatile contents therefrom. The composition thus obtained was blow-molded at 150° C. The film obtained was evaluated, as a packaging bag, for mechanical strength and other properties by the same methods as in Example 7. The results obtained are shown in Table 3.

EXAMPLE 9

Into a tank reactor having a capacity of 50 L was introduced a monomer mixture I consisting of 1.8 kg of methyl acrylate, 1.53 kg of acrylic acid, 0.68 kg of methyl methacrylate, 5 kg of methanol, and 32 g of 2,2'-azobis(2, 4-dimethylvaleronitrile) (calculated Tg of the polymer to be yielded from the monomer mixture I: 55° C.). In a nitrogen atmosphere, the monomer mixture I was heated to 60° C. and polymerized to a conversion of 78% for 30 minutes. Subsequently, a monomer mixture J consisting of 0.5 kg of butyl acrylate, 1.2 kg of ethyl acrylate, 1.0 kg of acrylic acid, 3.3 kg of methanol, and 22 g of 2,2'-azobis(2,4-dimethylvaleronitrile) (calculated Tg of the polymer to be yielded from the monomer mixture J: 4° C.) was added dropwise at a constant rate over a period of 1.5 hours to successively conduct polymerization at 60° C. After completion of the addition, the polymerization was continued at 60° C. for further 2 hours for aging. As a result, coating material (8) was obtained which contained a polymer having a number-average molecular weight of $9.5 \times 10^4$ and, upon analysis with a DSC, giving a differential curve in which the ratio of the height of the peak top appearing on the lower-temperature side (18.1° C.) to the height of the peak top appearing on the higher-temperature side (58.6° C.) was 1/1.

Coating material (8) was treated with a twin-screw extruder to remove volatile contents therefrom in the same manner as in Example 7, and then blow-molded at 200° C. The film obtained was evaluated, as a packaging bag, for mechanical strength and other properties by the same methods as in Example 7. The results obtained are shown in Table 3.

EXAMPLE 10

Into a tank reactor having a capacity of 50 L was introduced a monomer mixture K consisting of 2.1 kg of methyl acrylate, 1.05 kg of acrylic acid, 3.85 kg of methyl methacrylate, 7 kg of methanol, and 56 g of 2,2'-azobis(2, 4-dimethylvaleronitrile) (calculated Tg of the polymer to be yielded from the monomer mixture K: 55° C.). Into another tank reactor having a capacity of 50 L was introduced a monomer mixture L consisting of 2.55 kg of ethyl acrylate, 0.45 kg of acrylic acid, 3 kg of methanol, and 24 g of 2,2'-azobis(2,4-dimethylvaleronitrile) (calculated Tg of the polymer to be yielded from the monomer mixture L: −11° C.). In a nitrogen atmosphere, the monomer mixtures K and L were separately heated to 65° C. and polymerized to a conversion of 58% and 78%, respectively, for 1 hour. Subsequently, the contents of the tank reactor in which the monomer mixture L had been polymerized were added dropwise at a constant rate over a period of 1 hour to the other tank reactor, in which the monomer mixture K had been polymerized, to successively conduct polymerization at 65° C. After completion of the addition, the polymerization was continued at 65° C. for further 1 hour for aging. As a result, coating material (9) was obtained which contained a polymer having a number-average molecular weight of $7.5 \times 10^4$ and, upon analysis with a DSC, giving a differential curve in which the ratio of the height of the peak top appearing on the lower-temperature side (10.2° C.) to the height of the peak top appearing on the higher-temperature side (57.1° C.) was 4/6.

Coating material (9) was treated with a twin-screw extruder to remove volatile contents therefrom in the same manner as in Example 7, and then blow-molded at 190° C. The bag-form film obtained was evaluated, as a packaging bag, for mechanical strength and other properties by the same methods as in Example 7. The results obtained are shown in Table 3.

COMPARATIVE EXAMPLE 6

In a nitrogen atmosphere, the monomer mixtures E and F used in Example 7 were separately heated to 65° C. and polymerized to a conversion of 95% or higher for 2 hours. As a result, a solution containing a polymer having a number-average molecular weight of $6.7 \times 10^4$ and a Tg of 51.3° C. was obtained from the monomer mixture E, while a solution containing a polymer having a number-average molecular weight of $7.9 \times 10^4$ and a Tg of 10.8° C. was obtained from the monomer mixture F. The polymer-containing solutions obtained were mixed to obtain comparative coating material (5). Comparative coating material (5) was treated with a twin-screw extruder to remove the volatile matter therefrom in the same manner as in Example 7, and then blow-molded at 180° C. The bag-form film obtained was evaluated, as a packaging bag, for mechanical strength and other properties by the same methods as in Example 7. The results obtained are shown in Table 3.

COMPARATIVE EXAMPLE 7

The film obtained in Comparative Example 4 was evaluated, as a packaging bag, for mechanical strength and other properties by the same methods as in Example 7. The results obtained are shown in Table 3.

COMPARATIVE EXAMPLE 8

Into a tank reactor having a capacity of 50 L was introduced a comparative monomer mixture E consisting of 3.5 kg of ethyl acrylate, 0.5 kg of acrylic acid, 1.0 kg of methyl methacrylate, 5 kg of methanol, and 10 g of 2,2'-azobis(2, 4-dimethylvaleronitrile) (calculated Tg of the polymer to be yielded from the comparative monomer mixture E: 4° C.). In a nitrogen atmosphere, the comparative monomer mixture E was heated to 65° C. and polymerized to a conversion of 69% for 30 minutes. Subsequently, a comparative monomer mixture F consisting of 1.0 kg of ethyl acrylate, 1.5 kg of acrylic acid, 2.5 kg of methyl methacrylate, 5 kg of methanol, and 10 g of 2,2'-azobis(2,4-dimethylvaleronitrile) (calculated Tg of the polymer to be yielded from the comparative monomer mixture J: 69° C.) was added dropwise at a constant rate over a period of 2 hours to successively conduct polymerization at 65° C. After completion of the addition, the polymerization was continued at 65° C. for further 2 hours for aging. In this Comparative Example, the acrylic acid content of the comparative monomer mixture E was 10% and that of the comparative monomer mixture F was 30%. As a result, comparative coating material (6) was obtained which contained a polymer having a number-average molecular weight of $7.3 \times 10^4$ and, upon analysis with a DSC, giving a differential curve in which the ratio of the height of the peak top appearing on the lower-temperature side (25.2° C.) to the height of the peak top appearing on the higher-temperature side (65.3° C.) was about 6/4.

Comparative coating material (6) obtained was heated in a twin-screw extruder at a reduced pressure to remove volatile contents therefrom. The composition thus obtained was blow-molded at 180° C., and the film obtained was evaluated, as a packaging bag, for mechanical strength and other properties by the same methods as in Example 9. The results obtained are shown in Table 3.

TABLE 3

| | Example | | | | Comparative Example | | |
|---|---|---|---|---|---|---|---|
| | 7 | 8 | 9 | 10 | 6 | 7 | 8 |
| Tensile strength (kgf/mm$^2$) | | | | | | | |
| Conditions 1 | 1.9 | 2.3 | 2.7 | 2.3 | 1.2 | 4.0 | 1.8 |
| Elongation (%) | 280 | 260 | 220 | 230 | 120 | 220 | 140 |
| Tear strength (kgf/mm) | 1.53 | 1.73 | 0.91 | 1.04 | 0.23 | 0.31 | 0.42 |
| Parallel-ray transmittance (%) | 90 | 85 | 88 | 84 | 24 | 90 | 58 |
| Whitening | A | A | A | A | C | A | C |
| Acid value (mgKOH/g) | 119 | 175 | 302 | 117 | 118 | 39 | 153 |
| Solubility in aqueous detergent solution (min) | 5 | 3 | 6 | 6 | 15 | insoluble | 13 |
| Solubility in water (min) | insoluble | insoluble | 4 | insoluble | insoluble | insoluble | insoluble |
| Heat sealability (kg/15 mm) | 3.3 | 3.5 | 3.0 | 2.9 | 2.2 | 3.0 | 2.6 |

Table 3 shows the following. The packaging bags of Examples 7 to 10 were satisfactory in strength, transparency, and heat sealability, did not undergo whitening, and were most suitable for use as a packaging bag. Moreover, these packaging bags were also alkali-soluble. In particular, the packaging bag of Example 9, which had a particularly high acid value, were also water-soluble.

The polymer of the present invention undergoes little property change with changing temperature, is soluble or swells in water and/or is soluble or swells in alkali solutions, and has excellent transparency, because it is a polymer obtained by polymerizing an α,β-unsaturated carboxylic acid monomer and another vinyl monomer and having an acid value of 50 mgKOH/g or higher, and because it gives, upon analysis with a differential scanning calorimeter, a differential curve having one peak top at least in each of the range of from −80 to 20° C. and the range of from 20 to 120° C. and has a parallel-ray transmittance of 80% or higher.

In the case where the α,β-unsaturated carboxylic acid monomer is acrylic acid and/or methacrylic acid, and where at least 7% by weight of the polymer is accounted for by structural units derived from the α,β-unsaturated carboxylic acid monomer, the polymer of the present invention has improved flexibility and toughness and has a good balance between solubility and water resistance.

In the case where the polymer of the present invention is a polymer obtained by non-aqueous polymerization from those monomers in which at least 30% by weight of the vinyl monomer is accounted for by an alkyl acrylate and/or an alkyl methacrylate, it has improved flexibility, toughness, gloss, weatherability, and transparency, has a homogeneous structure, is less susceptible to whitening, and has sufficient strength.

In the case where the polymer of the present invention contains a polyvalent-metal salt, it has enhanced mechanical strength, is less susceptible to blocking, and has a reduced dependence of strength and dimensional stability to temperature and humidity.

Since the film of the present invention comprises the polymer described above and the packaging bag of the present invention comprises the film, they are printable, undergo little strength change with changing temperature, are less susceptible to blocking at high temperatures, are highly flexible at low temperatures, have high tensile and tear strength, are less susceptible to whitening upon stretching, are soluble in water and/or alkali solutions, and have excellent transparency.

The label of the present invention either consists only of a label base comprising the film describe above, or comprises the label base and an adhesive. In the latter case, the label is either a dissolution type label which is removed through dissolution, or a peeling type label which peels off without undergoing dissolution. All these embodiments of the label of the present invention can be easily removed during the washing of the labeled articles, e.g., bottles, and are hence exceedingly useful.

Since the coating material of the present invention contains the polymer described above and an organic solvent, it is capable of forming a coating layer which is printable, is less susceptible to blocking at high temperatures, is highly flexible at low temperatures, is soluble or swells in water and/or is soluble or swells in alkali solutions, and has excellent transparency and gloss.

Since the production process of the polymer according to the present invention, which is a process of non-aqueous polymerization, is characterized as comprising the steps of polymerizing the first monomer mixture comprising at least 7% by weight α,β-unsaturated carboxylic acid monomer and another vinyl monomer by non-aqueous polymerization to a conversion of from 20 to 80%, and adding the second monomer mixture and at least one optional monomer mixture each comprising at least 7% by weight α,β-unsaturated carboxylic acid monomer and another vinyl monomer and giving a polymer having a glass transition temperature different from that of the polymer yielded from the first monomer mixture, to the non-aqueous polymerization system dropwise or portion-wise to further conduct polymerization, it is possible to efficiently produce a polymer which is printable, undergoes little strength change with changing temperature, is less susceptible to blocking at high temperatures, is highly flexible at low temperatures, has high tensile and tear strength, is less susceptible to whitening upon stretching, is soluble or swells in water and/or is soluble or swells in alkali solutions, and has excellent transparency.

In the case where the difference in the content of an α,β-unsaturated carboxylic acid monomer between the monomer mixtures A, B, etc. is 10% by weight or smaller, a polymer especially having excellent transparency can be produced efficiency.

In the case where the process of the present invention further contains the step of mixing a polyvalent-metal salt, films of the thus-obtained polymer have higher mechanical strength (tensile strength and tear strength), enhanced antiblock properties, and a further reduced dependence of strength and dimensional stability to temperature or humidity.

While the invention has been described in detail and with reference to specific embodiments thereof, it will be apparent to one skilled in the art that various changes and modifications can be made therein without departing from the spirit and scope thereof.

What is claimed is:

1. A polymer comprising structural units derived from an α,β-unsaturated carboxylic acid monomer and structural units derived from another vinyl monomer, said polymer having (1) an acid value of 50 mgKOH/g or higher, (2) when analyzed with a differential scanning calorimeter, a differential DSC curve having at least one peak top in each of the range of from −80 to 20° C. and the range of from 20 to 120° C., and (3) a parallel-ray transmittance of 80% or higher, wherein said α,β-unsaturated carboxylic acid monomer is at least one selected from the group consisting of acrylic acid and methacrylic acid, and said structural units derived from said α,β-unsaturated carboxylic acid monomer are contained in an amount at least 7% by weight based on the amount of said polymer, and wherein at least 30% by weight of said structural units derived from said another vinyl monomer is at least one selected from the group consisting of an alkyl acrylate and an alkyl methacrylate.

2. A polymer as in claim 1, wherein said at least one peak top in the range of from −80 to 20° C. and said at least one peak top in the range of from 20 to 120° C. each have a peak half value width of 5 to 30° C.

3. A polymer as in claim 1, wherein said at least one peak top in the range of from −80 to 20° C. and said at least one peak top in the range of from 20 to 120° C. each have a peak top height of 50 W/min and a half value width of 5 to 30° C.

* * * * *